United States Patent
Carter (10) Patent No.: US 6,851,382 B2
(45) Date of Patent: Feb. 8, 2005

(54) FLOATING COLLAPSIBLE UTILITY TRAILER

(76) Inventor: Vita Carter, P.O. Box 176, Helendale, CA (US) 92342

( * ) Notice: Subject to any disclaimer, the term of this patent is extended or adjusted under 35 U.S.C. 154(b) by 0 days.

(21) Appl. No.: 10/851,037

(22) Filed: May 21, 2004

(65) Prior Publication Data
US 2004/0211350 A1 Oct. 28, 2004

Related U.S. Application Data

(63) Continuation-in-part of application No. 10/326,193, filed on Dec. 20, 2002.

(51) Int. Cl.$^7$ .................................................. B60P 3/10
(52) U.S. Cl. ..................... 114/344; 114/354; 280/414.1
(58) Field of Search ............................... 114/343, 344, 114/354, 351, 352; 280/414.1

(56) References Cited

U.S. PATENT DOCUMENTS

| D292,785 S | * | 11/1987 | Warren ....................... D12/101 |
| 4,781,392 A | * | 11/1988 | Cooper ..................... 280/414.1 |
| 5,228,713 A | * | 7/1993 | Kovach .................... 280/414.1 |
| 5,332,249 A | * | 7/1994 | Solberg et al. .......... 280/414.1 |
| 6,536,367 B1 | * | 3/2003 | Carter ........................ 114/344 |

* cited by examiner

Primary Examiner—Stephen Avila
(74) Attorney, Agent, or Firm—Lewis M. Brande; Thomas A. McCleary; Brande and McCleary (57) ABSTRACT

This invention describes a float able, collapsible utility trailer which can be filled with gear and towed behind a boat or, alternatively, pulled behind a person on dry land. The unit is collapsible for easy carrying and storage and comes with a carrying handle.

4 Claims, 11 Drawing Sheets

FLOATING COLLAPSIBLE UTILITY TRAILER

This application is a Continuation-in-Part application to Ser. No. 10/326,193 filed Dec. 20, 2002.

BACKGROUND OF THE INVENTION

1. Field of the Invention

In the field of utility trailers, persons are at a disadvantage if they wish to carry extra objects when they go boating. Most trailers that are currently available, are either designed with very large capacities in mind, or are made specifically to convert into a boat. Examples of existing designs include trailers that are towed behind a motor-vehicle and are easily converted to either a motorized boat, a non-motorized boat, or a boat-like object. The current designs are designed with personal water-craft and small boat owners in mind who would like to carry extra objects such as coolers, canopies, beach chairs etc. outside the boat area. This aggravates the problem of space consumption that the all carryon items create, or in the case of personal crafts, is not available at all.

The current invention is a small collapsible trailer that is made from a flexible material, which makes the trailer very easy to collapse into a smaller size than it takes up when in use. The trailer is pulled like a wagon, then launched into the water. It can then be pulled from the water behind a PC or boat. The current invention is specifically designed for carrying bulky objects, such as water coolers, that ordinarily would take up too much space in small boats or is not available to personal water-craft owners. The current invention is water tight and is designed to be towed behind a small boat or personal water-craft on the water. When the carryon objects are in the utility trailer, more space is made available in the boat

2. Description of the Prior Art

Collapsible utility trailers are known in the art.

U.S. Pat. No. 3,940,813 discloses a collapsible trailer boat wherein the fore part and after part are hinged together so that the trailer can be pivotally moved. When open, the trailer represents a boat in the shape of a catamaran. The after portion of the boat has provisions to mount an outboard motor. When closed, the fore part rests on the after part with the fore part's bottom facing upwards. The after portion of the trailer boat may be used as a single room home when on land, while the fore part may be used as a separate craft.

U.S. Pat. No. 3,090,973 discloses a boat having a front section and a rear section where the front section may be pivoted until it rests over the rear portion, forming a storage compartment. The trailer boat has wheels that may be retracted. The patent also discloses the trailer/boat being capable of use as a sleeping or living quarters.

U.S. Pat. No. 2,659,464 discloses a hinged boat, shaped cargo carrier that is capable of being made water and dirt tight. The invention is made to be carried on top of a motor-vehicle.

The foregoing descriptions of prior art patents disclose trailers that all are made from hard materials and are all hinged at a center area to fold closed.

SUMMARY OF THE INVENTION

The present invention offers a solution to the shortcomings of the prior art inventions.

The object of the present invention is to provide a trailer that is small enough to be easily carried inside a motor vehicle. This will make it relatively easy for persons with small craft to carry the trailer without measurable loss of valuable space.

Another object of the present invention is to wheels that easily rotate to which will allow the owner easy movement from the motor vehicle to the water, and return. The invention has straps mounted on the sides that allow for easy second to the craft when in the water, allowing for towing the invention in the water on the side of the personal watercraft.

Another object of the present invention is that the trailer is fabricated from soft materials such as but not limited to vinyl, plastic and like materials that are easily sealed and made waterproof as well as flexible. These materials allow the trailer to be made water tight, allowing the trailer to be towed behind or attached to the side of a boat. This advantage frees up valuable space in small personal boats. The trailer can be easily collapsed creating a small footprint for storage. Fabricating the present invention from soft materials has the additional benefit of making the floating trailer light

BRIEF DESCRIPTION OF THE DRAWINGS

1. Figure one shows an exploded isometric view of a first embodiment,

2. Figure two shows a top view of the second embodiment,

3. Figure three shows a left side view of the second embodiment,

4. Figure four shows a front view of the second embodiment,

5. Figure five shows a rear view of the second embodiment,

6. Figure six a bottom view of the second embodiment,

7. Figure seven shows an isometric view of the storage compartment,

8. Figure eight shows a cross sectional view of the cross support,

9. Figure nine shows an installed wheel assembly,

10. Figure ten shows a second embodiment of an installed wheel assembly,

11. Figure eleven shows the second embodiment of a floating collapsible utility trailer in isometric view, 12. Figure twelve is an isometric view without the cargo compartment, 13. Figure thirteen is a view looking up at the bottom of the floating collapsible utility trailer, 14. Figure fourteen shows the floating collapsible utility trailer in its stowed form, 15. Figure fifteen shows a cross-sectional view of the floating collapsible utility trailer.

DETAILED DESCRIPTION OF THE PREFERRED EMBODIMENTS

While the invention is susceptible of embodiment in many different Forms, there is shown in the drawings and will herein be described in detail, one specific embodiment, with the understanding that the present disclosure is to be considered as an exemplification of the principles of the invention and is not intended to limit the invention to the embodiment illustrated.

Figure 1:
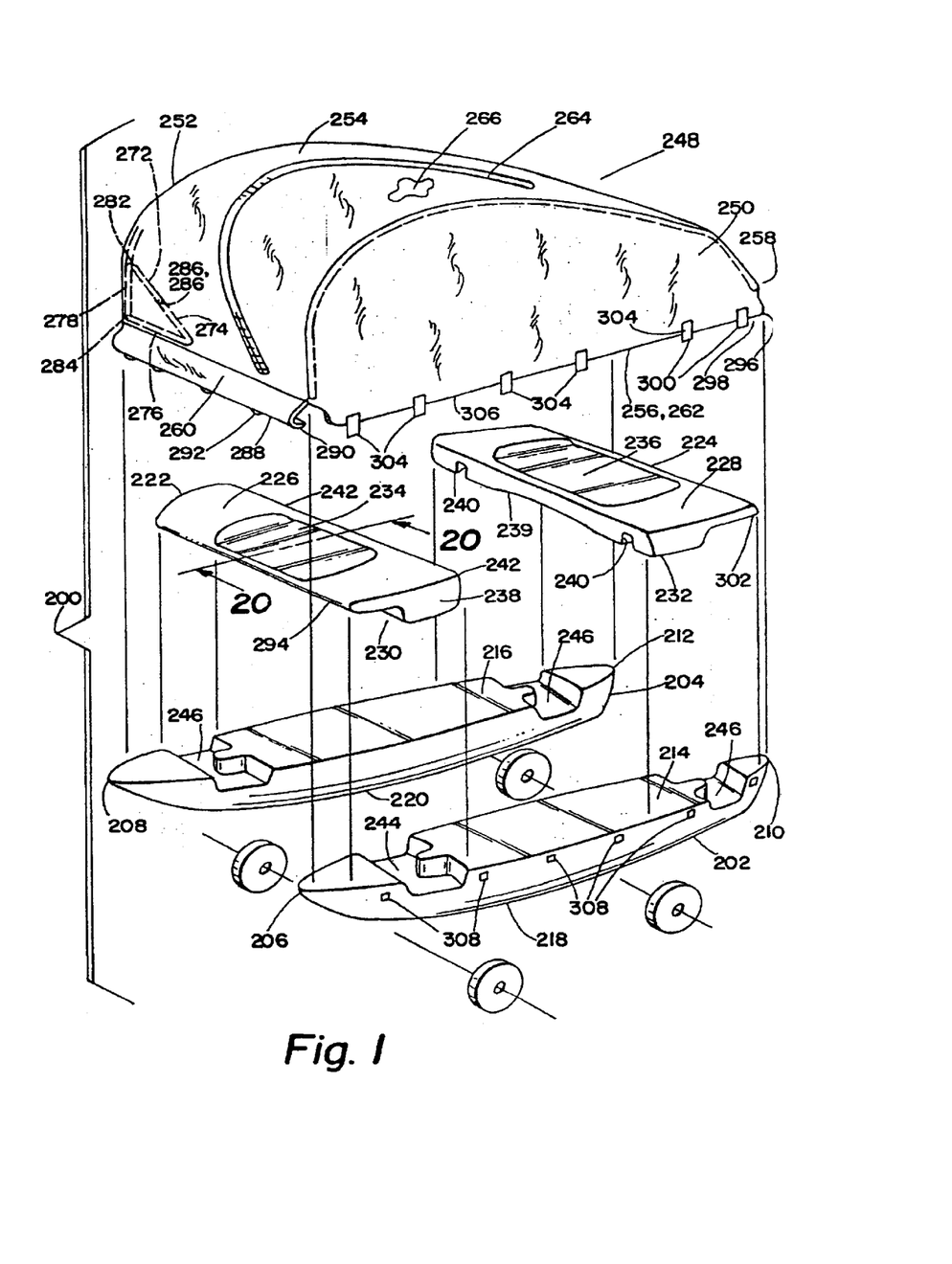
Figure 2:
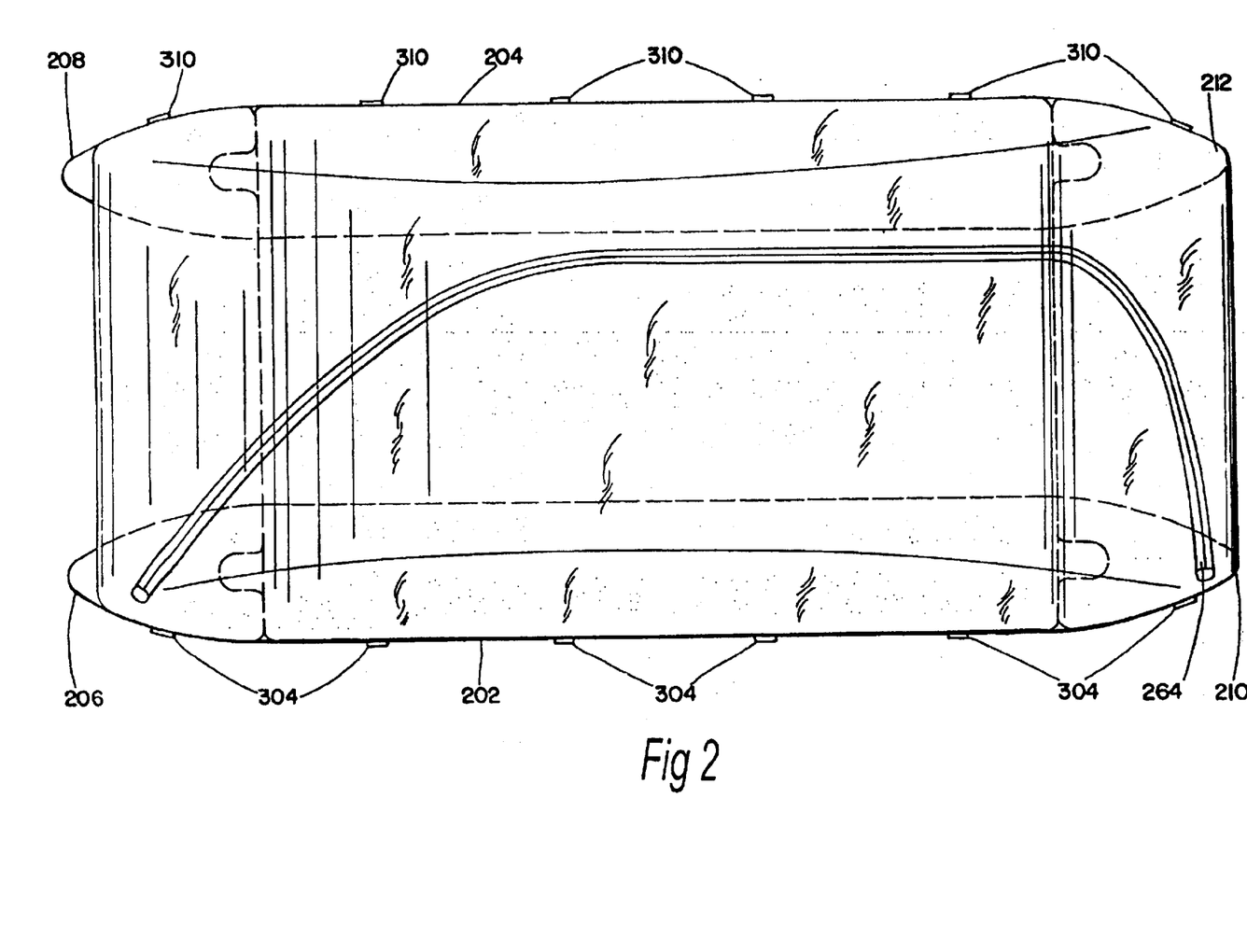
Figure 3:
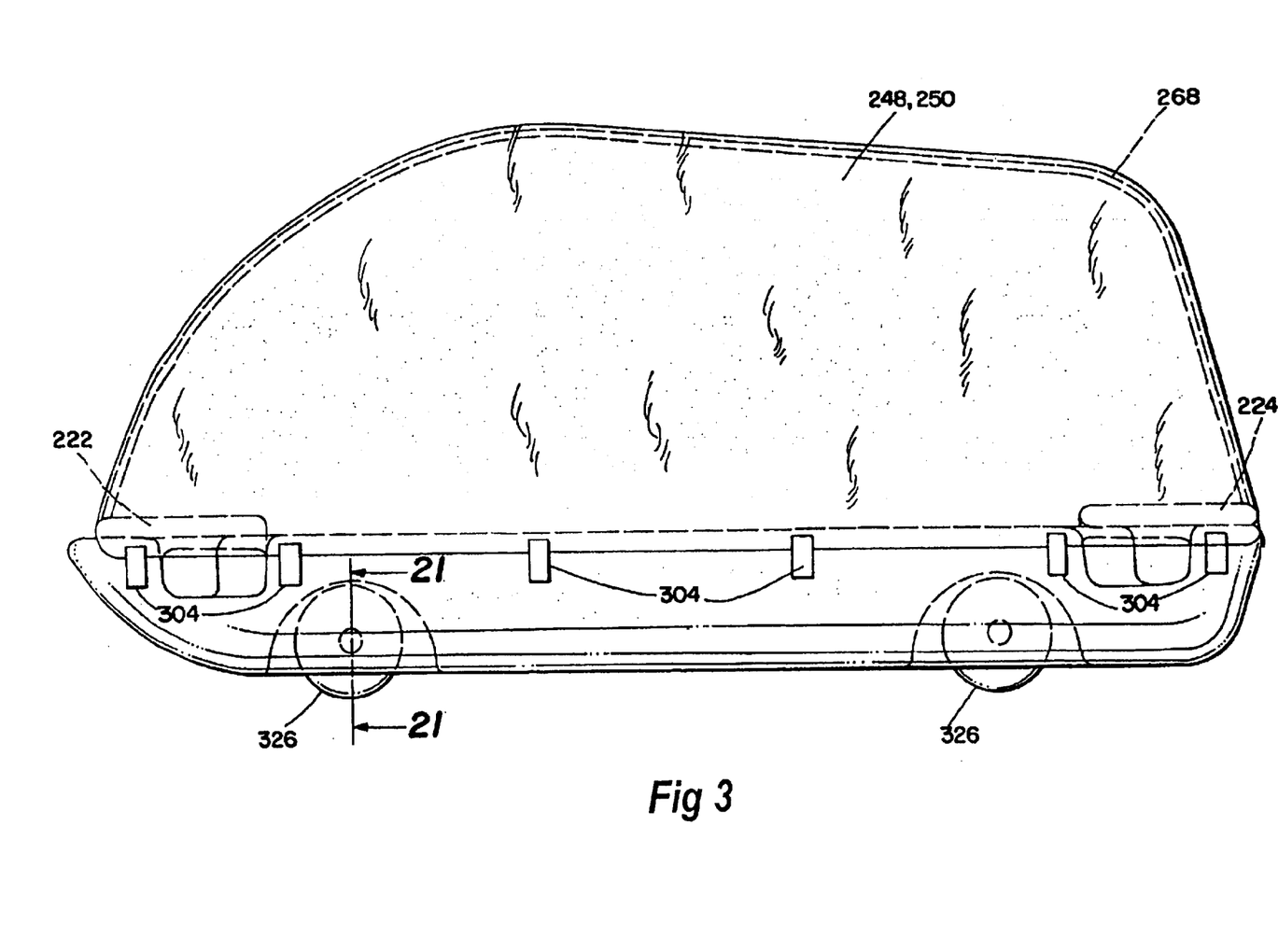
Figure 4:
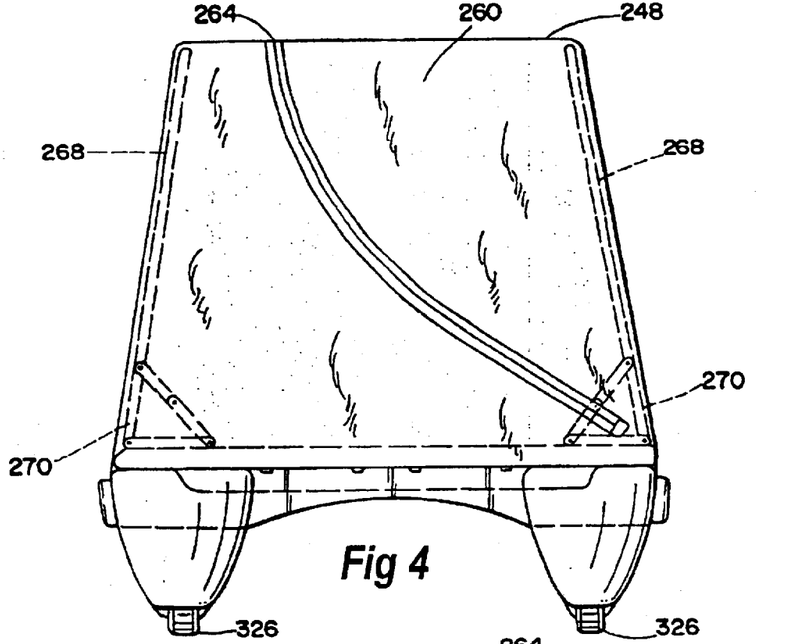
Figure 5:
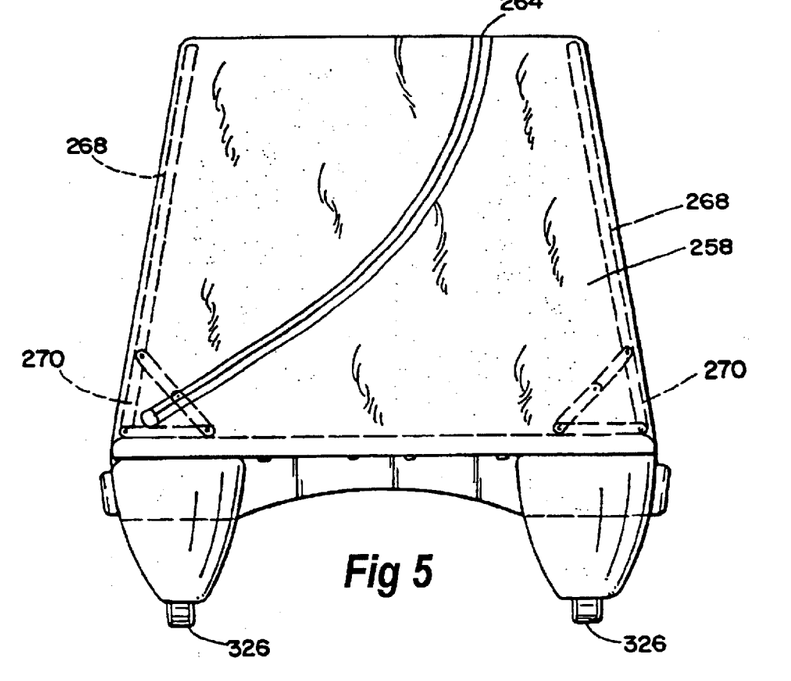
Figure 6:
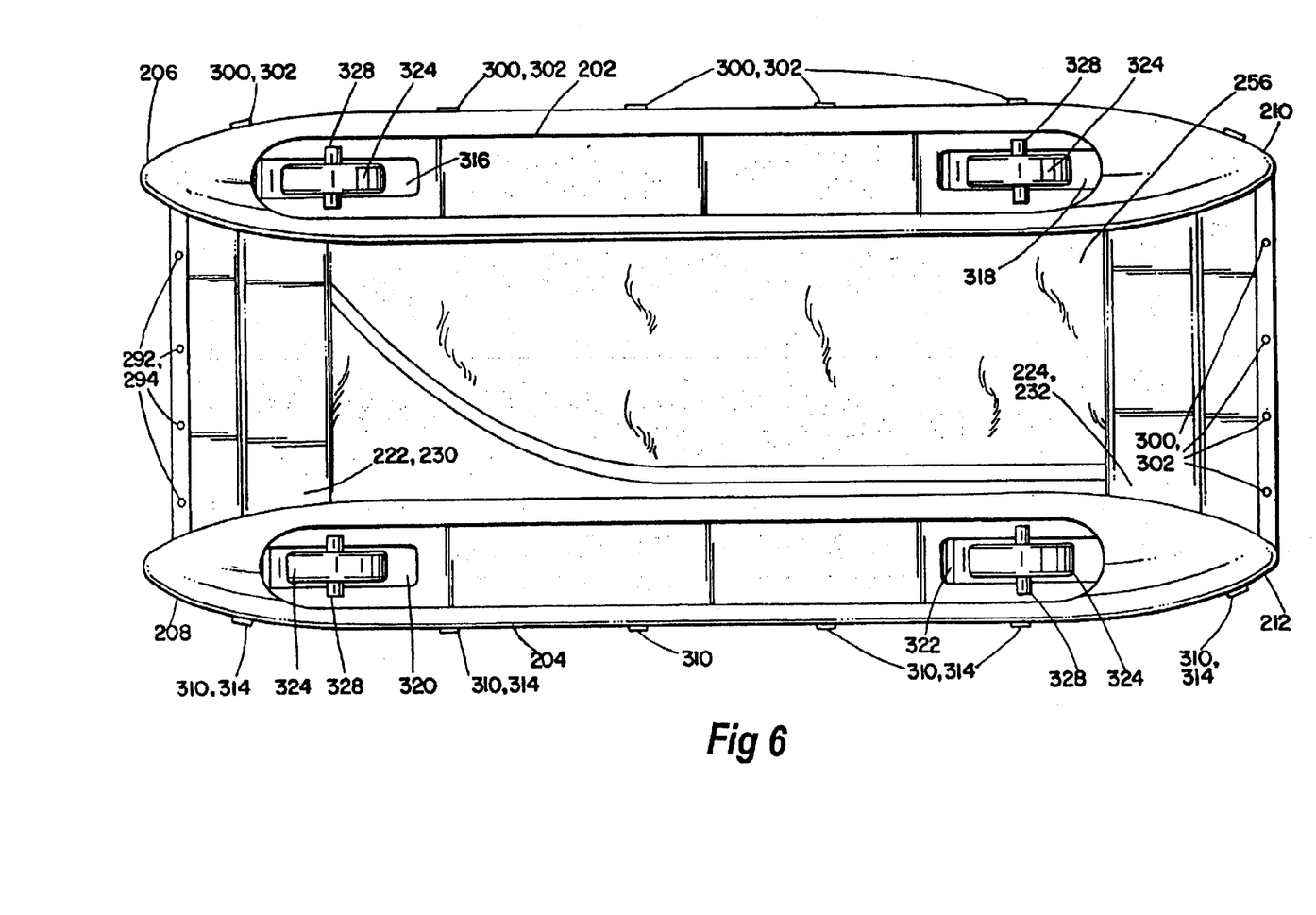

With respect to figure one, a first embodiment of the collapsible floating utility trailer (200) is shown having a first side support rail (202) and a second side support rail (204). The first and second side support rail (202,204) are both arranged in a parallel relationship. The first and second side support rails (202,204) may be made as two identical components. The first and second side support rails (202, 204) each have a forward end (206,208) and an aft end (210,212), with the forward ends (206,208) and the aft ends (210,212) each having a hydrodynamic shape that allows the first and second side support rails (202,204) to cut through the water more easily than if the forward ends (206,208) of the first and second side support rails (202,204) were more square.

The first and second side support rails (202,204) each have a top side (214,216) and a bottom side (218,220) where the bottom sides (218,220) are shaped as most boats are shaped, i.e. "U" or "V" shaped, with the bottom of the "U" or "V" pointing downwards. The top sides (214,216) of the first and second side of the support rail (202,204) is essentially flat. The first and second side support rails (202,204) each are made as floatation devices, where the flotation devices are common in the art of ships and canoes. The first and second side support rails (202,204) can be made watertight and hollow, with air inside providing buoyancy or they may have light foam providing buoyancy or, as is done in canoes, watertight compartments in the forward (206,208) and aft ends (210,212) providing buoyancy.

The collapsible floating utility trailer (200) further has a first trailer cross support (222) and a second trailer cross support (224). The first and second trailer cross support (222,224) separate the first and second side support rails (202,204) to a predetermined length, and maintain the first and second trailer cross support (222,224) in a parallel relationship. The first and second trailer cross support (222, 224) may be made identical for manufacturing purposes. The first and second trailer cross supports (222,224) each have a top surface (226,228) and a bottom surface (230,232). The top surfaces (226,228) of the first and second trailer cross supports (222,224) each has a recess (234,236). The recesses (234,236) provide additional storage area, and a flat surface for a collapsible storage compartment (248) when the collapsible storage compartment (248) is installed. The bottom surfaces (230,232) have a stiffening block (238,239), where the stiffening blocks (238,239) project downwards and provide a means to attach to the first and second side support rails (202,204).

One means of attachment for the first and second trailer cross supports (222,224) to the first and second side support rails (202,204) is provided when the first and second trailer cross supports (222,224) each have a pair of slots (240,242). The slots (240,242) are located on opposing ends of the first and second trailer cross supports (222,224), and interlock with a recess (244,246) defined in the forward (206,208) and aft ends (210,212) of the first and second side support rails (202,204). The recesses (244,246) of the first and second side support rails (202,204) have a shape complimentary to the pair of slots (240,242) in the first and second trailer cross supports (222,224). The interlocking feature herein defined may be made so the first and second trailer cross supports (222,224) either "snap" into the recesses (244,246) or are "press-fit" into the recesses (244,246) of the first and second side support rails (202,204). By manufacturing the first and second trailer cross supports (222,224) and the first and second side support rails (202,204) as identical components, fabrication and assembly costs will be reduced, and assembly is made easier as non-identical parts located on left/right or port/starboard are eliminated.

Figure 7:
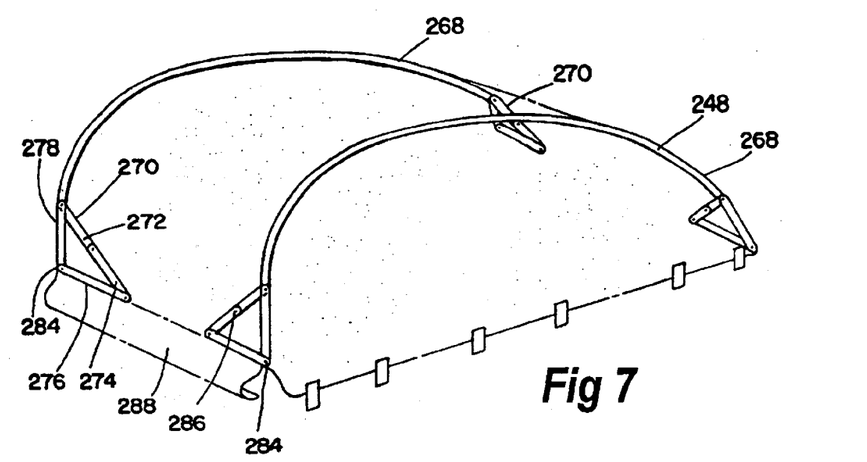
Figure 8:
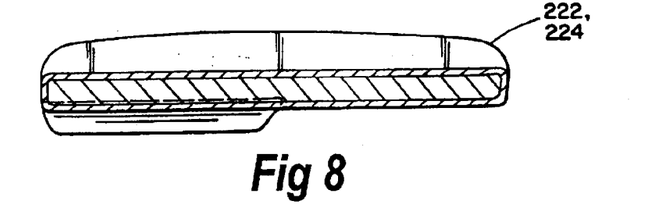

The collapsible storage compartment (248) has a first side (250), an opposing second side (252), a top (254), a bottom (256), a rear (258), and a front (260). When the collapsible storage compartment (248) is in the expanded position, the first side (250) is essentially parallel to the second side (252). The bottom (256) is attached to the first side (250) and the second side (252) creating an essentially flat bottom for storage. The front (260) is attached to the bottom (256), the first side (250) and the second side (252). The top (254) is attached to the front (260), the first side (250) and the second side (252). The rear (258) is attached to the first side (250), the second side (252), the top (254), and the bottom (256). When all the components are attached as herein defined, the collapsible storage compartment (248) becomes a water tight container that is capable of protecting the objects stored from the outer environment, such as when the collapsible floating utility trailer (200) is used on the water. A zipper (264) or other means is installed onto the collapsible storage compartment (248) to allow access to an interior compartment (266). The zipper (264) or other means runs from the front (260) to the top (254), and ends at the rear (258) of the collapsible storage compartment (248).

Support rods (268) are installed into the first (250) and second side (252) of the collapsible storage compartment (248) in order to provide support and give the collapsible storage compartment (248) the desired shape. In the front (260) and the rear (258) of the collapsible storage compartment (248) guide means (270) are installed. The guide means (270) are attached to the support rods (268) in the first (250) and second side (252) of the collapsible storage compartment (248) and to the front (260) and rear (258) of the collapsible storage compartment (248) as necessary. The guide means (270) are known in the art of folding tables, and are typically made as a series of links, typically of four (4) distinct rods attached together. Typically the guide means (270) are assembled in the shape of a triangle, where a first rod (272) and a second rod (274) are attached together and oriented to create an angle of ninety (90) degrees. A third (276) and fourth (278) rod are attached together in line (180 degrees) where the third rod (276) is attached to the second rod (274), and the fourth rod (278) is attached to the first rod (272).

The first (272), second (274), third (276) and fourth rod (278) thereby create a triangular shape. The third (276) and fourth rod (278) each have interlocking detents (280,282) to firmly position the guide means (270) into the triangular position. The first (272), second (274), third (276), and fourth rod (278) are attached in a way so as to provide a tight frictional fit therebetween. Moving the attach point (284) between the third (276) and fourth rod (278) towards the attach point (286) between the first (272) and second rod (274) allows the guide means (270) to collapse, thereby collapsing the collapsible storage compartment (248).

The optimal number of guide means (270) is four, where each guide means (270) is located in a corner of the collapsible storage compartment (248). i.e. the corner where the first side (250), the front (260), and bottom (256) meet; the corner where the first side (250), the rear (258), and the bottom (256) meet; the corner where the second side (252), the front (260), and bottom (256) meet; and the corner where the second side (252), the rear (258), and the bottom (256) meet.

The front (260) of the collapsible storage compartment (248) has a front flap (288) that extends around the first trailer cross support (222). At a first loose end (290) of the front flap (288) a first set of attach means (292) are located. Complementary attach means (294) are located on the first trailer cross support (222), and allow the front flap (288) and hence the collapsible storage compartment (248) to be attached to the first trailer cross support (222). The rear (258) of the collapsible storage compartment (248) has a rear flap (296) that extends around the second trailer cross support (224). At a second loose end (298) of the rear flap (296), a second set of attach means. (300) are located. Complementary attach means (302) are located on the second trailer cross support (224) and allow the rear flap (296), and hence the collapsible storage compartment (248) to be attached to the second trailer cross support (224). The first side (250) has a third set of attach means (304) located on a bottom edge (306) of the first side (250). A complementary set of attach means (308) is located on the first side support rail (202). When the third set of attach means (304) are connected to the complementary set of attach (308) means located on the first side support rail (202), the first side (250), and hence the collapsible storage compartment (248) is attached to the first side support rail (202). The second side (252) has a fourth set of attach means (310) located on a bottom edge (312) of the second side (252). A complementary set of attach means (314) is located on the second side support rail (204). When the fourth set of attach means (310) are connected to the complementary set of attach means (314) located on the second support rail (204), the second side (252), and hence the collapsible storage compartment (248) is attached to the second side support rail (204). In order to remove the collapsible storage compartment (248) from the first and second side support rails (202,204), and the first and second trailer cross supports (222,224), the attach means (292,294,300,302,304,308,310, 314) must be disconnected, thereby allowing the collapsible storage compartment (248) to be removed from a trailer frame and collapsed for easy storage.

The attach means (292,294,300,302,304,308,310,314) may be snaps, over center latches, or Velcro® or other easily removable attach means.

Figure 9:
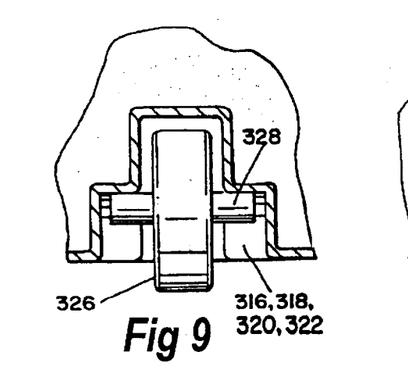

The first and second side support rails (202,204) each have recesses (316,318,320,322) in the bottom (218,220) to accommodate the installation of wheel assemblies (324). In one embodiment, a wheel (326) with a through rod (328) is installed into the predefined recess (316,318,320,322), and the wheel (326) is "snap fit" into position, preventing unwanted movement or loss of the wheel (326). There would generally be at least 2 wheels (326) installed in the first and second side support rails (202,204), providing adequate rolling support for the trailer (200).

Figure 10:
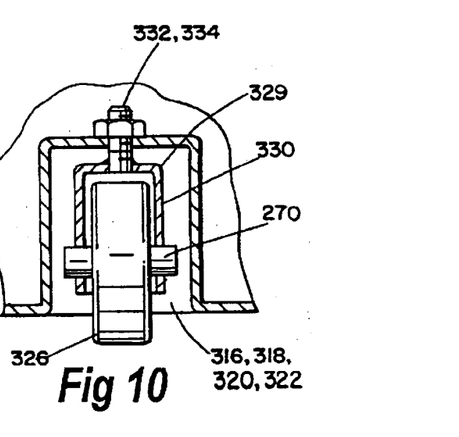

In a second embodiment of a wheel assembly, a wheel assembly (329) is bolted into the first and second side support rails (202,204), thus allowing the wheel (326) to rotate and provide a small amount of steering to the front and/or rear of the side support rails (202,204). The wheel assembly (329) consists of a wheel (326) having a through rod (328), and a "U" shaped bracket (330) that positions the wheel (326) therein. The "U" shaped bracket (330) has a bolt (332) projecting upwards to attach to a nut (334) installed in the recesses of the first and second side support rails (202,204).

A second embodiment of the disclosed invention is the preferred embodiment. Figure ten shows a perspective view of the third embodiment of the floating collapsible utility trailer (400). The floating collapsible utility trailer (400) has a first side support rail (402) and a second side support rail (404). The first and second side support rails (402,404) are made as opposing mating components. The first and second side support rails (402,404) each have a forward end (406, 410) and an aft end (408,412), the forward ends (406,410) and the aft ends (408,412) each having a hydrodynamic shape that allows the first and second side support rails (402,404) to cut through the water more easily than if the first and second side support rails (402,404) were made more square.

Figure 11:
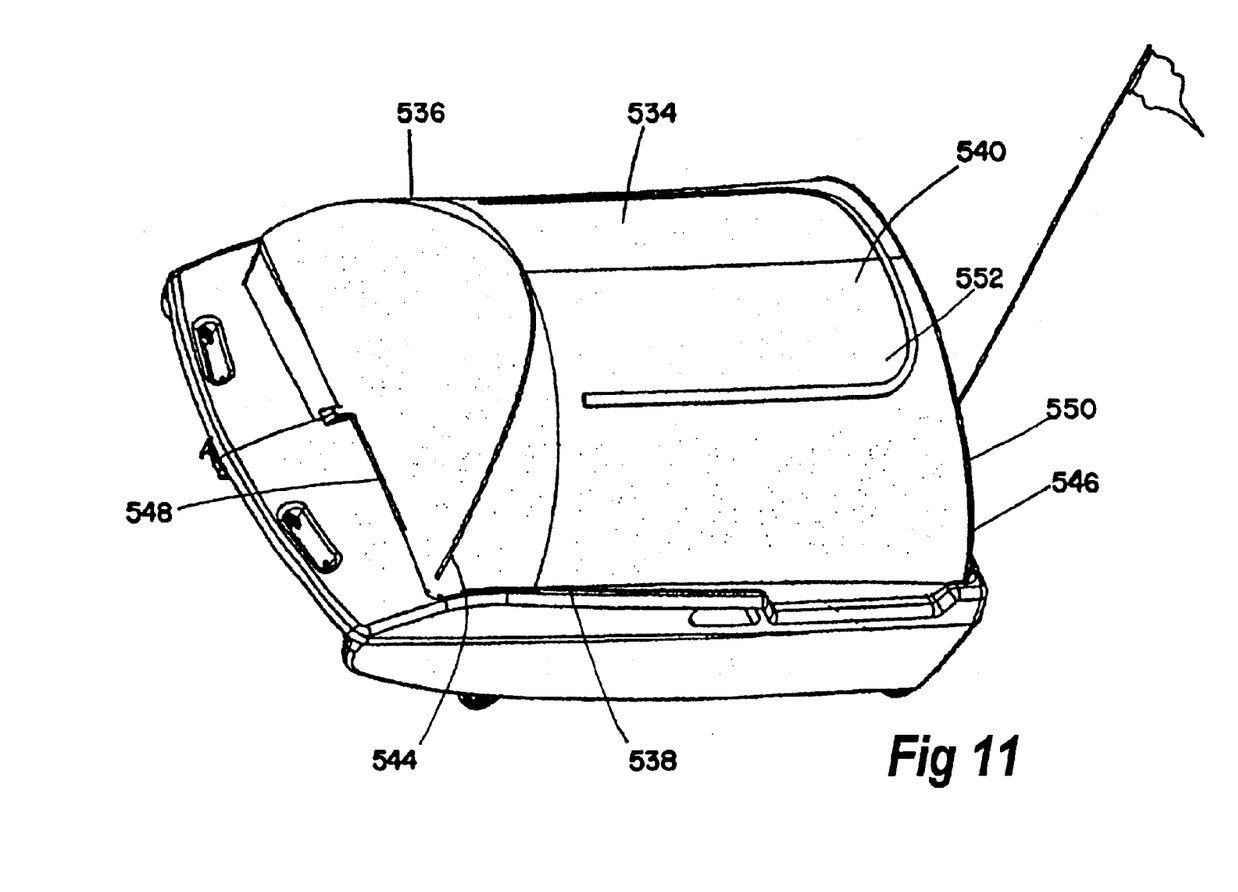

A left rail assembly (414) is comprised of the first side support rail (402), where the first side support rail (402) has a first floor support (416). The first floor support (416) extends towards an inside portion (418) of the floating collapsible utility trailer (400). In order to provide the maximum amount of support for the first floor support (416), a series of stiffening grooves (420) are incorporated into the first floor support (416). The first floor support (416) has a forward end (422) and an aft end (424). The aft end (424) of the first floor support (416) has an aft wall (426) projecting upwards. The first side rail (402) has a first side wall (428) projecting upwards where an aft end (430) of the first side wall (428) intersects with the aft wall (426) of the first floor support (416) creating a aft water-tight corner (432). The forward end (422) of the first floor support (416) has a first forward wall (434) projecting upwards. The first forward wall (434) may be inclined and shaped to provide a proper hydrodynamic shape, which also is visually pleasing to the owner of the floating collapsible floating utility trailer (400). The left rail assembly (414) has a first hand hold (436) defined therein, where the first hand hold (436) allows for easy grasping of the floating collapsible utility trailer (400).

A right rail assembly (438) of the floating collapsible utility trailer (400) is comprised of the second side support rail (404), where the second side support rail (404) has a second floor support (440). The second floor support (440) extends towards the inside portion (418) of the floating collapsible utility trailer (400). In order to provide the maximum amount of support for the second floor support (440), a series of stiffening grooves (442) are incorporated into the second floor support (440). The stiffening grooves (442) incorporated into the second floor support (440) are essentially in line, and parallel to the stiffening grooves (420) in the first floor support (416). The right rail assembly (438) has a second hand hold (444) defined therein, where the first hand hold (436) allows for easy grasping of the floating collapsible utility trailer (400).

The first and second hand holds (436,444) are generally opposing each other when the floating collapsible utility trailer (400) is expanded, allowing two individuals to easily carry the expanded floating collapsible utility trailer (400).

The second floor support (440) has a forward end (446) and an aft end (448). The aft end (448) of the second floor support (440) has an aft wall (450) projecting upwards. The second side rail (404) has a second side wall (452) projecting upwards where an aft end (454) of the second side wall (452) intersects with the aft wall (450) of the second floor support (440) creating an aft water tight corner (456). The forward end (446) of the second floor support (440) has a second forward wall (458) projecting upwards. The second forward wall (458) may be inclined and shaped to provide a proper hydrodynamic shape, which also is visually pleasing to the owner of the floating collapsible floating utility trailer (400).

In order to provide for the best water tight sealing for the floating collapsible floating utility trailer (400), the aft wall (426) of the first floor support (416) and the aft wall (450) of the second floor support (440) meet at a mid plane of the floating collapsible floating utility trailer (400). Correspondingly, the first floor support (416) and the second floor support (440) meet at the mid plane of the floating collapsible utility trailer (400) as well as the forward end (422) of the first floor support (416) and the forward end (446) of the second floor support (440) meeting at the mid plane of the floating collapsible floating utility trailer (400).

A first hinge means (460) is located on a top side (462,464) of the aft wall (426,450) of the first and second floor support (416,440), while a second hinge means (466) is located on a top side (468,470) of the forward wall (434,458) of the first and second floor support (416,440). The hinge means (460,466) may be simple "piano hinges", or be made from flexible material, or other type means.

A first latch means (472) is shown attached to a bottom side (474,476) of the forward wall (434,458) of the first and second floor support (416,440), while a second latch means (478)(not shown) is attached to a bottom side (480,482) of the aft wall (426,450) of the first and second floor support (416,440).

Figure 13:
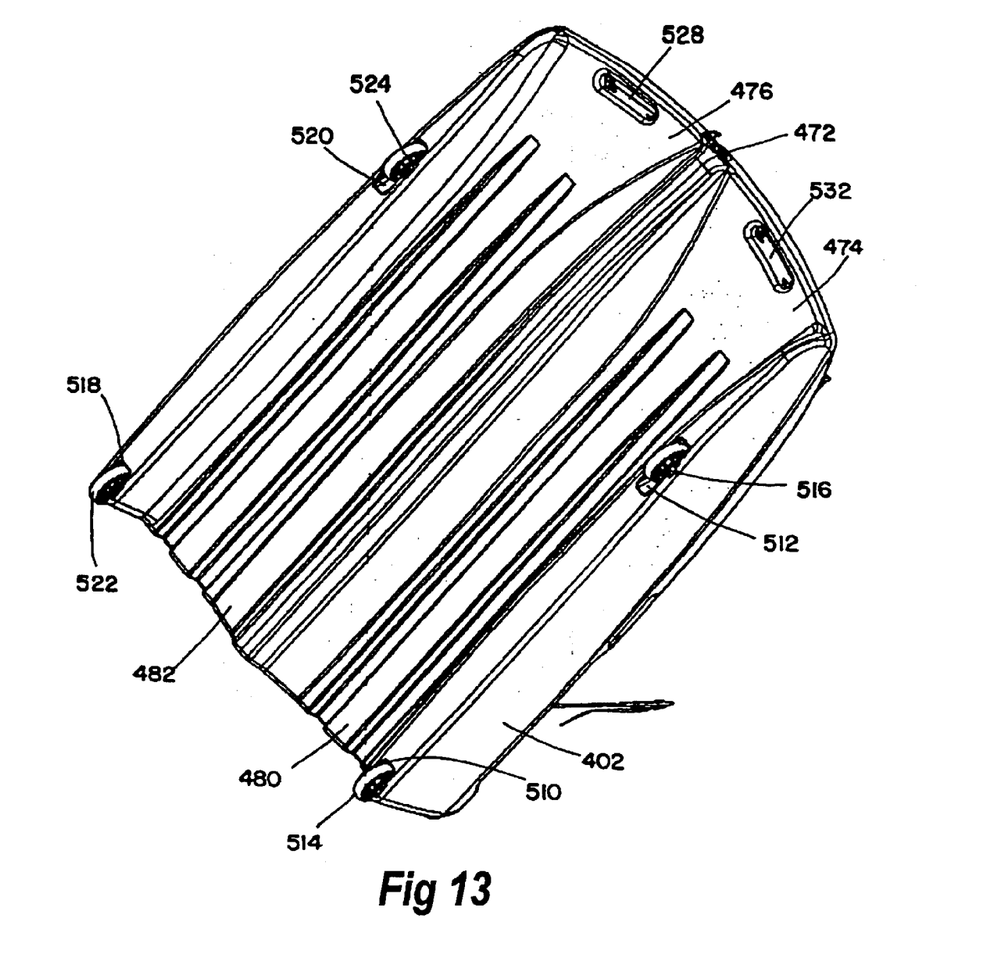

In order to provide for the greatest buoyancy of the floating collapsible utility trailer (400), the left rail assembly (414) is designed having a first outer hull (484). The first outer hull (484) is depicted in FIG. 13 and is shown having a first bottom (486), a first side (488), a second bottom (490), and a first gunwale (492). The first floor support (416) is shown above the first bottom (486) creating a space (494) therebetween. A first interior wall (496) is shown opposing the first gunwale (492). As is shown, the first gunwale (492), the first floor support (416), the first interior wall (496), the first side (488), the first bottom (486), the second bottom (490), and a first mid wall (498) is shown creating a volume (500) therein enclosed. The enclosed volume (500) is water tight, and may be filled with a buoyancy enhancing material such as foam, or even air.

In order to provide for the greatest buoyancy of the floating collapsible utility trailer (400), right rail assembly (438) is designed having a second outer hull (485). The second outer hull (485) is depicted in FIG. 13 and is shown having a third bottom (487), a second side (489), a fourth bottom (491), and a second gunwale (493). The second floor support (440) is shown above the second bottom (487) creating a space (495) therebetween. A second interior wall (497) is shown opposing the second gunwale (493). As is shown, the second gunwale (493), the second floor support (440), the second interior wall (497), the second side (489), the third bottom (487), the fourth bottom (491), and a second mid wall (499) is shown creating a second volume (501) therein enclosed. The second volume (501) is water tight, and may be filled with a buoyancy enhancing material such as foam, or even air.

The first mid wall (498) is shown having a tongue (502) projecting into a corresponding groove (504) in the second mid wall (499). A gasket (506) is shown interspaced between the right rail assembly (438) and the left rail assembly (414) assuring that there will be a reduction, if not elimination of water leakage into the interior (418) of the floating collapsible utility trailer (400). The gasket (506) may be attached to either the right rail (438) or left rail assembly (414), where the best location would be in a groove (508) of the right rail assembly (438), thereby protecting the gasket (506) from inadvertent damage. The right rail assembly (438) is made a mirror image of the left rail assembly (414) except for the differences herein described.

The left rail assembly (414) has defined therein a first recess (510) and a second recess (512). A first wheel assembly (514) is shown inserted into the first recess (510), while a second wheel assembly (516) is shown inserted into the second recess (512). The right rail assembly (438) has defined therein a third recess (518) and a fourth recess (520). A third wheel assembly (522) is shown inserted into the third recess (518), while a fourth wheel assembly (524) is shown inserted into the fourth recess (520). The first, second, third, and fourth wheel assemblies (514,516,522,524) are mounted into their respective recesses (510,512,518,520) in a conventional fashion that is will known in the art.

Figure 12:
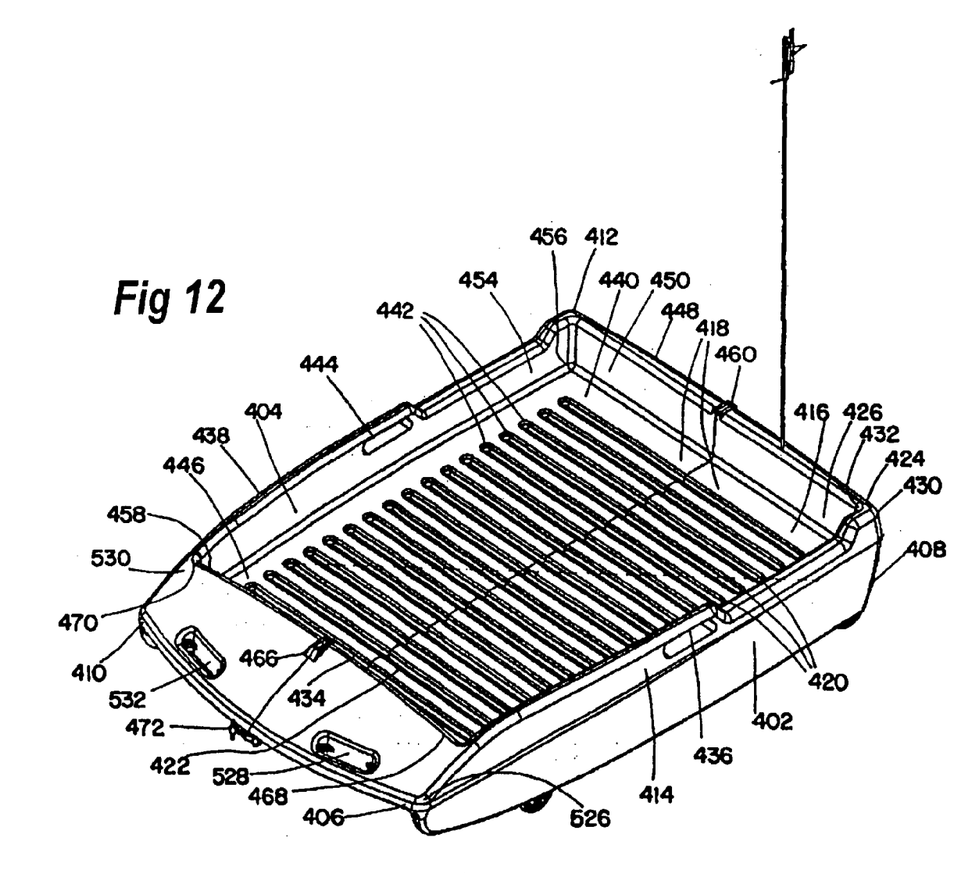

A first forward portion (526) of the left rail assembly (414) is shown having a first through slot (528) defined therein. A first forward portion (530) of the right rail assembly (438) is shown having a second through slot (532) defined therein. The first through slot (528) and the second through slot (532) provide a means to attach a tow rope or hitch to the floating collapsible utility trailer in order to allow the floating collapsible utility trailer to be towed by a boat or pulled on land (using the aforementioned wheel assemblies).

Figure 14:
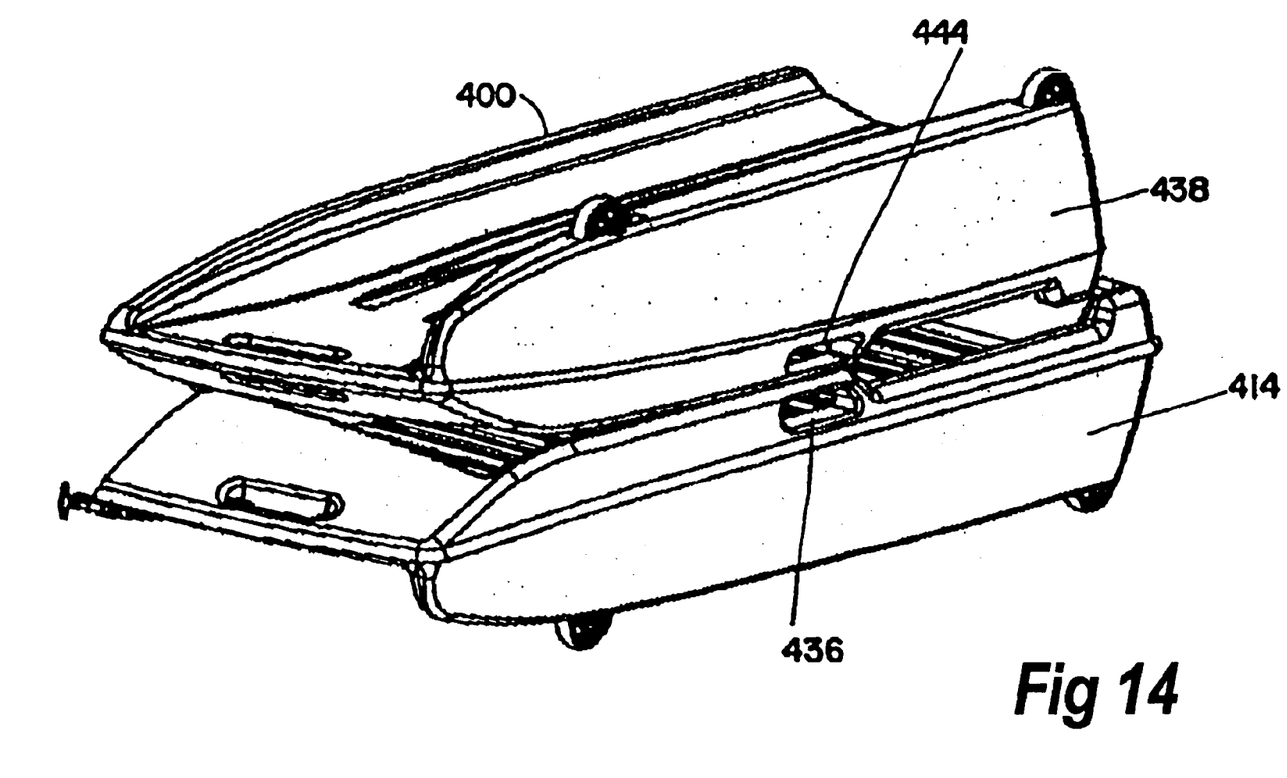
Figure 15:
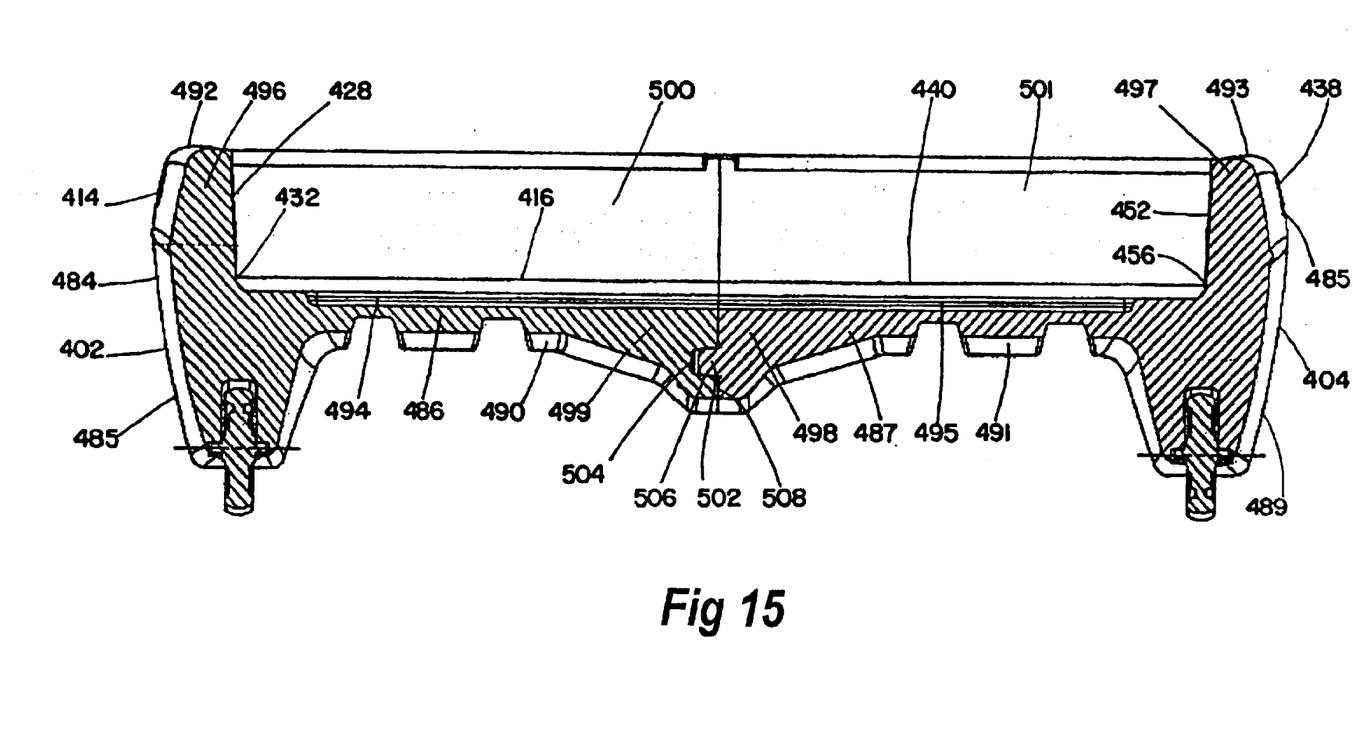

A collapsible storage compartment (534) is shown expanded and positioned on the floating collapsible utility trailer (400). The collapsible storage compartment (534) has a first side (536), and opposing second side (538), a top (540), and a bottom (542). The front (548) of the collapsible storage compartment (534) has a first support rod (544), while the rear (550) of the collapsible storage compartment (534) has a second support rod (546). The first and second support rods (544,546) expanding the collapsible storage compartment (534) to its maximum volumetric capacity. The top (540) of the collapsible storage compartment (534) has a zipper means (552), the zipper means (552) being generally "U" shaped and allowing for a maximum opening when the zipper means (552) is unhooked thereby allowing access to an interior of the collapsible storage compartment (534). The collapsible storage compartment (534) is held in place by the first and second support rod's (544,546) inherent stiffness in that the first side (536), opposing second side (538), front (548) and rear (550) are expanded to fill the interior (418) of the floating collapsible utility trailer (400), and are forcibly held in place. Standard attach means (not shown) are attached onto the collapsible storage compartment (534) to fix the collapsible storage compartment (534) in place. FIG. 14 shows the floating collapsible utility trailer (400) in its storage state, whereby the left rail assembly (414) and right rail assembly (438) contact each other. The first and second hand holds (436,444) are shown adjacent to each other on the left rail assembly (414) and the right rail assembly (438) providing a mounting means, and a carrying means to position and mount the floating collapsible utility trailer (400) on a wall or ceiling.

What is claimed is:

1. A floating collapsible utility trailer, comprising:

a. left rail assembly having a first side support rail, said first side support rail having a forward and an aft end, said first side support rail having a first floor support, said first floor support extending towards an inside portion of the floating collapsible utility trailer, said first floor support having stiffening grooves defined therein;

b. said first floor support having a forward end and an aft end, said aft end of said first floor support having an aft wall projecting upwards, said first side rail having a first side wall projecting upwards and intersecting with said aft wall creating a watertight corner, said forward end of said first floor support having a first forward wall, said first forward wall projecting upwards and intersects with said first side wall creating a watertight corner, said first side wall having a first hand hold defined therein;

c. a right rail assembly having a second side support rail, said second side support rail having a forward and an aft end, said second side support rail having a second floor support, said second floor support extending towards an inside portion of the floating collapsible utility trailer, said second floor support having stiffening grooves defined therein;

d. said second floor support having a forward end and an aft end, said aft end of said second floor support having an aft wall projecting upwards, said second side rail having a second side wall projecting upwards and intersecting with said aft wall creating a watertight corner, said forward end of said second floor support having a second forward wall, said second forward wall projecting upwards and intersecting with said second side wall creating a watertight corner, said second side wall having a second hand hold defined therein;

e. a first hinge means, said first hinge means being located on a top side of said aft wall on said left and right rail assembly, a second hinge means, said second hinge means being located on a top side of said forward wall of said left and right side rail assembly, a latch means, said latch means being located on a bottom side of said forward wall of said first and second floor support, a second latch means being attached to a bottom side of said aft wall of said first and second floor support, said left rail assembly and said right rail assembly hingeably meeting at a mid plane;

f. said left rail assembly having a first outer hull, said first outer hull having a first bottom, a first side, a second bottom and a first gunwale, said first floor support being located above said first bottom creating a space therebetween, a first interior wall is shown opposing said fist gunwale, said first gunwale, said first floor support said first interior wall, said first side, said first bottom, said second bottom, and said first mid wall creating a volume therein, said volume being water tight;

g. said right rail assembly having a second outer hull, said second outer hull having a third bottom, a second side, a fourth bottom and a second gunwale, said second floor support being located above said third bottom creating a space therebetween, a second interior wall is shown opposing said second gunwale, said second gunwale, said second floor support said second interior wall, said second side, said third bottom, said fourth bottom, and said second mid wall creating a volume therein, said volume being water tight;

h. said first mid wall having a tongue defined thereon, said right rail assembly having a groove defined therein to receive said tongue;

i. said floating collapsible utility trailer having a plurality of recesses defined therein, each of said plurality of recesses having a wheel assembly fixedly inserted therein; and j. said forward portion of said left rail assembly having a first through slot defined therein, said first forward portion of said right rail assembly having a second through slot defined therein, said first and second through slot having means to attach a tow rope thereupon.

2. The floating collapsible utility trailer as claimed in claim 1 further having;

a. a collapsible storage compartment, said collapsible storage compartment having a first side, a second side a top, a bottom, a front and a rear, said front of said collapsible storage compartment having a first support rod, said rear of said collapsible storage compartment having a second support rod, said first and second support rods providing shape and support for said collapsible storage compartment;

b. said top of said collapsible storage compartment having a zipper means to allow access to said collapsible storage compartment; and c. said collapsible storage compartment being attached to said left and right rail assemblies by attach means.

3. The floating collapsible utility trailer as claimed in claim 1, wherein said plurality of recesses and wheel assemblies is at least three.

4. The floating collapsible utility trailer as claimed in claim 1, wherein:

said left rail assembly further having a first recess and a second recess defined therein, a first wheel assembly being fixedly inserted into said first recess, and a second wheel assembly being fixedly inserted into said second recess, said right rail assembly further having a third recess and a fourth recess defined therein, a third wheel assembly being fixedly inserted into said third recess, and a fourth wheel assembly being fixedly inserted into said fourth recess.

* * * * *